United States Patent
Stockinger et al.

(10) Patent No.: US 10,137,353 B2
(45) Date of Patent: Nov. 27, 2018

(54) SYSTEM FOR TIMING AND SCORING AQUATIC SPORTS IN POOLS

(71) Applicant: EVERLAST CLIMBING INDUSTRIES, INC., Mendota Heights, MN (US)

(72) Inventors: Chris Stockinger, Loveland, CO (US); Eric Solanyk, Loveland, CO (US); Anne Jordan, Ft. Collins, CO (US); Brett Anderson, Ft. Collins, CO (US); Craig Jacobs, Lyons, CO (US); Pete Schiel, Denver, CO (US)

(73) Assignee: EVERLAST CLIMBING INDUSTRIES, INC., Mendota Heights, MN (US)

( * ) Notice: Subject to any disclaimer, the term of this patent is extended or adjusted under 35 U.S.C. 154(b) by 158 days.

(21) Appl. No.: 15/120,577

(22) PCT Filed: Feb. 20, 2015

(86) PCT No.: PCT/US2015/016748
§ 371 (c)(1),
(2) Date: Aug. 22, 2016

(87) PCT Pub. No.: WO2015/130562
PCT Pub. Date: Sep. 3, 2015

(65) Prior Publication Data
US 2017/0095722 A1    Apr. 6, 2017

Related U.S. Application Data

(60) Provisional application No. 61/944,670, filed on Feb. 26, 2014.

(51) Int. Cl.
*A63B 71/06* (2006.01)
*G06F 13/40* (2006.01)
*G07C 1/24* (2006.01)

(52) U.S. Cl.
CPC .......... *A63B 71/0686* (2013.01); *A63B 71/06* (2013.01); *G06F 13/4004* (2013.01); *G07C 1/24* (2013.01)

(58) Field of Classification Search
CPC . A63B 71/0686; A63B 71/06; G06F 13/4004; G07C 1/24
See application file for complete search history.

(56) References Cited

U.S. PATENT DOCUMENTS

2009/0219785 A1    9/2009   Klooster et al.
2010/0304934 A1   12/2010   Woodson
(Continued)

OTHER PUBLICATIONS

International Search Report and Written Opinion corresponding to international patent application No. PCT/US2015/16748, dated Feb. 20, 2015.
(Continued)

*Primary Examiner* — Daniel Pihulic
(74) *Attorney, Agent, or Firm* — McAndrews, Held & Malloy, Ltd.

(57) ABSTRACT

Various embodiments provide a system including connected system nodes, the system configured to provide timing and scoring for aquatic sports in pools. The spatial location of the nodes relative to the pool and pool reference points may be retrieved from the system and representations can be created. The representations may be used to first select the desired nodes for one or several sports events and then execute those sports events with the selected nodes. Electrical connections may be made from materials that withstand aggressive pool chemicals, such as titanium, Hastelloy or Inconel.

19 Claims, 5 Drawing Sheets

(56) References Cited

U.S. PATENT DOCUMENTS

| | | |
|---|---|---|
| 2013/0014585 A1 | 1/2013 | Hetherington |
| 2013/0059465 A1 | 3/2013 | Stockinger et al. |
| 2017/0095722 A1* | 4/2017 | Stockinger ......... A63B 71/0686 |

OTHER PUBLICATIONS

PCT, International Preliminary Report on Patentability, in International Application No. PCT/US2015/016748, dated Sep. 9, 2016, 7 pages.

* cited by examiner

--PRIOR ART--

SYSTEM FOR TIMING AND SCORING AQUATIC SPORTS IN POOLS

CROSS-REFERENCE TO RELATED APPLICATIONS/INCORPORATION BY REFERENCE

The present application claims priority under 35 U.S.C. § 119(e) to provisional application Ser. No. 61/944,670 filed on Feb. 26, 2014, entitled "System for Timing and Scoring Aquatic Sports in Pools." The above referenced provisional application is hereby incorporated herein by reference in its entirety.

FIELD OF THE INVENTION

Certain embodiments of the invention relate to electronic systems configured to provide timing and scoring for aquatic sports in pools. More specifically, certain embodiments of the invention relate to the set-up and configuration of electronic timing and scoring components installed at swimming pools for timing and scoring aquatic sports.

BACKGROUND OF THE INVENTION

Swimming pools used for aquatic sports are usually built as a tank of water surrounded by a pool deck. Pools may be situated within a building or outdoors. One or more movable bridges, referred to as bulkheads, may be positioned to bridge across a short width of a pool. The bulkheads may be used to segment a pool such that the pool can be used for several events at the same time.

In a swimming competition, each swimmer is assigned a lane, typically defined by floating lane lines that segregate the swimmers. Bulkheads can be used to create different lengths of the lanes by positioning them at the desired distance from a pool end. Typical lane lengths are, for example, 25 yards, 25 meters, and 50 meters.

Existing systems that acquire times of athletes competing in aquatic sports include several components, such as touch pads, pushbuttons, relay judging platforms, start systems, and start lights. For example, a touch pad may be positioned in the water at the end of each lane and configured to generate timing signals when touched by a swimmer. Pushbuttons, which are also referred to as backup buttons, may be activated by timing officials when a swimmer finishes a race. Relay judging platforms may detect when the athlete leaves the starting block. A start system with loudspeakers may transmit commands and start signals. Start lights may be used to visually signal swim starts.

The timing components provided in known timing and scoring systems are typically connected to connection hubs on one or both ends of each lane. These hubs can include one or several connection points and can be positioned directly on the pool deck, on a starting block, or on a bulkhead. Adjacent swimming lanes, each having two ends and connection hubs at those two ends, form a course. The hubs of all lanes on one end of the course are connected together and into course connections, also referred to as wall plates.

Timing and scoring systems may be provided at a pool as an in-deck system, an on-deck system, or a combination thereof. An in-deck system includes hubs and course connections installed in the pool deck, walls, and, if present, bulkheads. An on-deck system is a non-permanent installation that includes wireless hubs and/or hubs laid out on cables on the deck.

Conventional systems include a control device, also referred to as a timer, having a processor that connects to the course connections and acquires the signals from the timing components. The acquired signals are processed by the control device to provide times and/or scores of the competition. The times and scores may be transmitted to various types of scoreboards, video boards, or any suitable mechanism for providing timing and scoring information.

Referring again to the hubs and course connections of an in-deck and on-deck system, consecutive hubs on one side of a course are electrically and logically connected at one end of the pool. For example, one end of the pool may include a hub for each lane and the course connections for these hubs in either the walls of the pool building (e.g., in-deck system) or the end of the cable harness (e.g., on-deck system). In the case of an in-deck system for an outdoor pool without walls, the course connections can alternatively be positioned in tombstones, monuments, parapets, or the like. There can be more than one course connection for one end.

A course defined for a swim race includes a near end and a far end. The near end is the end where the control device is located and plugged into the corresponding course connection. The far end is the end of the course opposite the near end. Starting blocks, often equipped with relay judging platforms that are mounted on the starting blocks, are typically placed at the near end. Touch pads and backup buttons are plugged into the near end hubs of each lane to time the finish of a race. In certain configurations, touch pads may also be plugged into the hubs at the far end to generate split times.

A pool may be configured to include one or more different courses. For example, a long course along the length of a 50 meter pool and a cross course across the 25 yards of the width of the pool. Further, one or several bulkheads may be used to create any suitable course length, with a few lengths such as 50 meters, 25 meters, and 25 yards being preferred by the swimming rules.

Existing in-deck systems use complex course connection setups to accommodate flexible course and end configurations. For example, each course connection typically includes connection parts corresponding with each end of the pool. The connection parts of each course connection are routed to the other course connections to allow either end of the pool to be designated as the near end. The timer devices typically include near and far end connectors for mating with connection parts of the course connection to define the near and far ends of a course. For example, when the near end connection of the control device is plugged into a connection part of a course connection that corresponds to a given end of the course, the selected end is defined as the near end. Similarly, the far end is defined when the far end connector of the timer is connected to the other connection part of the course connection.

To change a course configuration from, for example, a long course to a cross course, timer connection cables are unplugged from the long course connection and plugged into both parts of the cross course connection. The near and far ends of the course are defined by plugging the near and far timer connections into the selected connection parts of the course connection as described above.

Existing on-deck systems are set-up by laying out cable harnesses and plugging the harnesses into the corresponding near end and far end connectors of the control device. To change the course configuration, the cable harnesses are moved and again plugged into the corresponding near end and far end connectors of the control device.

In addition to the timing components discussed above, existing timing and scoring systems may include scoreboards, game clocks, shot clocks, and the like. Typically, a control device has a scoreboard data output that drives a scoreboard through scoreboard data connections. The scoreboard data connections are usually routed and positioned near each of the course connections such that the control device may connect to both of a scoreboard data connection and a course connection. The scoreboard data connections may include multiple connectors corresponding with different scoreboard configurations. Existing systems may also include separate data connections for diving scores, synchronized swimming scores, water polo scores, shot clocks, game clocks, and the like. The data is received by a control device that processes the scoring data into results that are presented on scoreboards via the separate data connections.

FIG. 1 is a plan view of an exemplary spatial arrangement of a pool 1 having a conventionally wired in-deck timing and scoring system, as is known in the art. Referring to FIG. 1, a pool 1 aligned north to south and having exemplary dimensions of 50 meters by 25 yards is shown with timing and scoring system components. The timing and scoring system components can include, for example, a control device 10, hubs 3, 5, 7, 9, course connections 11-15, 31, scoreboards, 16, 17, scoreboard data connections 18-21, 32, scoring data connections 35, 36, and moveable cables 33.

The pool 1 may include north 2 and south ends. The north end 2 of the pool 1 includes hubs 3. A bulkhead 4, currently set at the south end of the pool 1, includes corresponding hubs 5. The bulkhead 4 can be moved in the north-south direction to set a length for a swim race, such as 50 meters, 25 meters, or 25 yards, with, for example, the near end on the north side 2 and the far end on the south side. The bulkhead course has eight lanes, represented by the black lines ending in a "T" shape, which guide the swimmers. The pool 1 also includes east 6 and west 8 ends. In the exemplary arrangement of FIG. 1, eight of the twenty lanes, represented by the broken lines with T ends, have been equipped with timing hubs 7, 9 allowing for the timing of cross course races with a distance of 25 yards.

As configured in FIG. 1, the bulkhead 4 is set to 50 meters and is connected to its corresponding course connection 15 with a moveable cable 33. For shorter distances, such as 25 meters or 25 yards, the bulkhead 4 may be plugged into a mid-pool course connection 31 with the movable cable 33. The course connections 11-15, 31 include an input for hubs 3, 5, 7, 9 and an output to control device 10.

The control device 10, set up at the north-west corner of the pool for a bulkhead course (near end on the north side), is plugged into both parts of the north-western bulkhead course connection 11. The north end 2 may be defined as the near end by connecting the black connection from the black/white course connection 11 with the near end plug on the control device 10 and connecting the gray connection into the far end plug on the control device 10. To change the course configuration to the east-west cross course, the control device connection cables for timing may be unplugged from the bulkhead course connection 11 and plugged into the cross course connection 12.

The black/white scoreboard 16 on the south wall or the gray scoreboard 17 on the east wall may be selected by plugging into the respective black/white or gray scoreboard data connection 18 from the control device 10. In the example of FIG. 1, the control device 10 is connected to the gray scoreboard 17 by coupling to the gray part of the scoreboard data connection 18. Scoreboard data connections 19-21 and 32 are not used in the configuration illustrated in FIG. 1 but may be used to connect to either or both of scoreboards 16, 17. The scoring data connections 35, 36 may be connected to each other, similar to scoreboard data connections 18-21, 32. The scoring data connections 35, 36 may be used, for example, to allow two diving events to be controlled simultaneously by control device 10.

In summary, FIG. 1 illustrates the bulkhead hubs 3, 5 of each course end 2, 4 connected to the course connections 11, 14, 15, 31. The course connections 11, 14, 15, 31 each have two connector parts for the hubs 3, 5. The course connections 11, 14, 15, 31 are connected with both ends to each other, as symbolized by the gray and black connecting lines in the walls. The east-west short course ends 6, 8 with hubs 7, 9 are connected to the course connections 12, 13, which are also connected to each other on both ends in the walls. The scoreboards 16 and 17 are connected to the scoreboard data connections 18, 19, 20, 21 and 32. The scoreboard data connections 18, 19, 20, 21 and 32 are connected to each other in a similar fashion as the timing course connections, but the connections in the walls are omitted from FIG. 1 for clarity purposes.

Accordingly, to serve different setups for several sports in a current pool 1 having an existing timing and scoring system, a complex and expensive set of multiple, two-part course connections 11-15, 31, scoreboard data connections 18-21, 32, scoring data connections 35, 36, and time data connections are conventionally used. The set-up and configuration of these existing systems require careful connecting of multiple cables from the control device into the correct ends of the desired course and into multiple data connections, which is laborious and prone to user error. Additionally, any desired change of the configuration requires careful re-connecting of multiple cables.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for the set-up and configuration of electronic timing and scoring components installed at swimming pools for timing and scoring aquatic sports, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
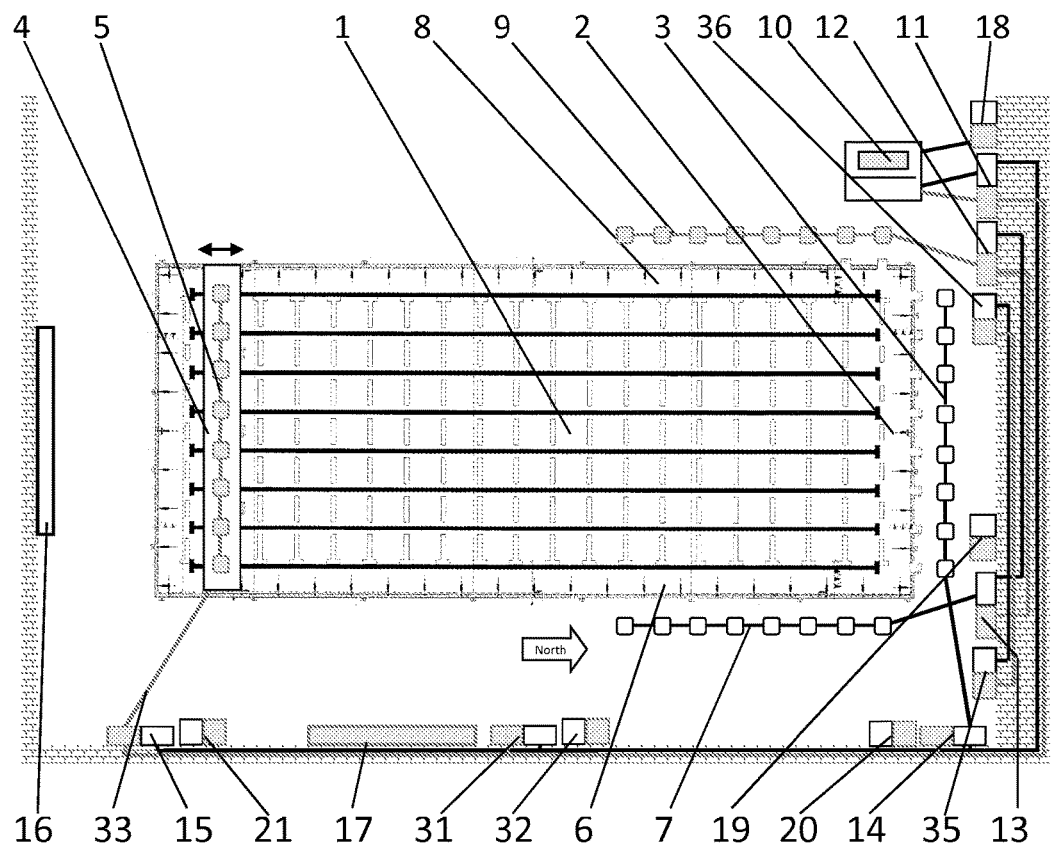
FIG. 1 is a plan view of an exemplary spatial arrangement of a pool having a conventionally wired in-deck timing and scoring system, as is known in the art.

Certain embodiments of the invention may be found in electronic timing and scoring systems and methods of use. More specifically, certain embodiments provide a system and method for the set-up and configuration of electronic timing and scoring components installed at swimming pools for timing and scoring aquatic sports. An example embodiment of the present invention aids users by reducing the number of connections of the system, thereby simplifying installation with much less connection wiring than conventional timing systems. As another example, the present invention allows users to configure a course and/or change a course configuration by manipulating displayed node representations at a control device without having to plug or unplug cables.

Various embodiments provide a system configured to provide timing and scoring for aquatic sports in pools. The system comprises a plurality of nodes 16, 17, 22-25, 27 and at least one control device node 10. Each of the plurality of nodes 16, 17, 22-25, 27 comprises a location relative to a pool 1. The at least one control device node 10 is connected to at least one of the plurality of nodes 16, 17, 22-25, 27. The at least one control device node 10 is configured to access spatial knowledge related to at least one of the location of the plurality of nodes 16, 17, 22-25, 27, a position of the pool 1, and reference points 26 of the pool 1. The at least one control device node 10 is configured to generate at least one representation (FIGS. 3-6) of the plurality of nodes 16, 17, 22-25, 27 and the pool 1 based on the spatial knowledge. The at least one control device node 10 is configured to select a plurality of the plurality of nodes 16, 17, 22-25, 27 to set up at least one event based on the at least one representation. The at least one control device node 10 is configured to configure the selected plurality of nodes 16, 17, 22-25, 27 for the at least one event. The at least one control device node 10 is configured to execute the at least one event based on the configured plurality of nodes 16, 17, 22-25, 27.

As used herein, the terms "exemplary" or "example" means serving as a non-limiting example, instance, or illustration. As used herein, the term "e.g." introduces a list of one or more non-limiting examples, instances, or illustrations.

The foregoing summary, as well as the following detailed description of certain embodiments will be better understood when read in conjunction with the appended drawings. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments of the present invention. The following detailed description is, therefore, not to be taken in a limiting sense, and the scope of the present invention is defined by the appended claims and their equivalents As used herein, an element recited in the singular and proceeded with the word "a" or "an" should be understood as not excluding plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Figure 2:
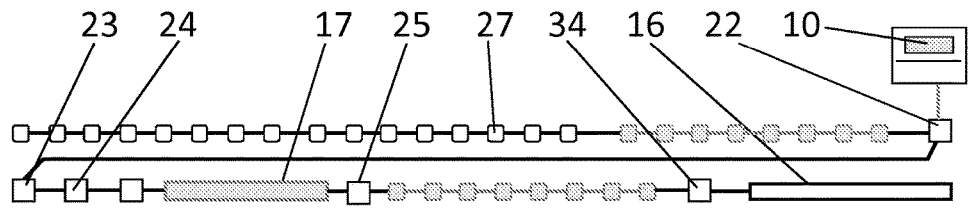
FIG. 2 is a block diagram of an exemplary bus system having nodes, in accordance with an embodiment of the invention.

FIG. 2 is a block diagram of an exemplary bus system having nodes 10, 16, 17, 22-25, 27, 34, in accordance with an embodiment of the invention. Referring to FIG. 2, the nodes may comprise a control device node 10, scoreboard nodes 16, 17, course connection nodes 22-25, hub nodes 27, and a floor plate node 34. The intelligent and communicating nodes of the in-deck and/or on-deck system are connected to each other on a bus, each node having a unique identifier. For example, the control device 10 may be connected to a course connection 22 that is a participating node on a bus and carries the signals of the other nodes on the bus. The other course connection nodes 23, 24, 25 of the bus system could also be used to connect the control device 10 to the system. The system carries spatial information relative to an origin for each node such that a user of the control device 10 may distinguish between nodes at various locations. To illustrate an improvement created by an exemplary embodiment of the invention, the course connection node 22 of FIG. 2 may replace the course connections 11, 12, scoreboard connections 18, and scoring data connections 36 of the conventional setup in FIG. 1.

Figure 3:
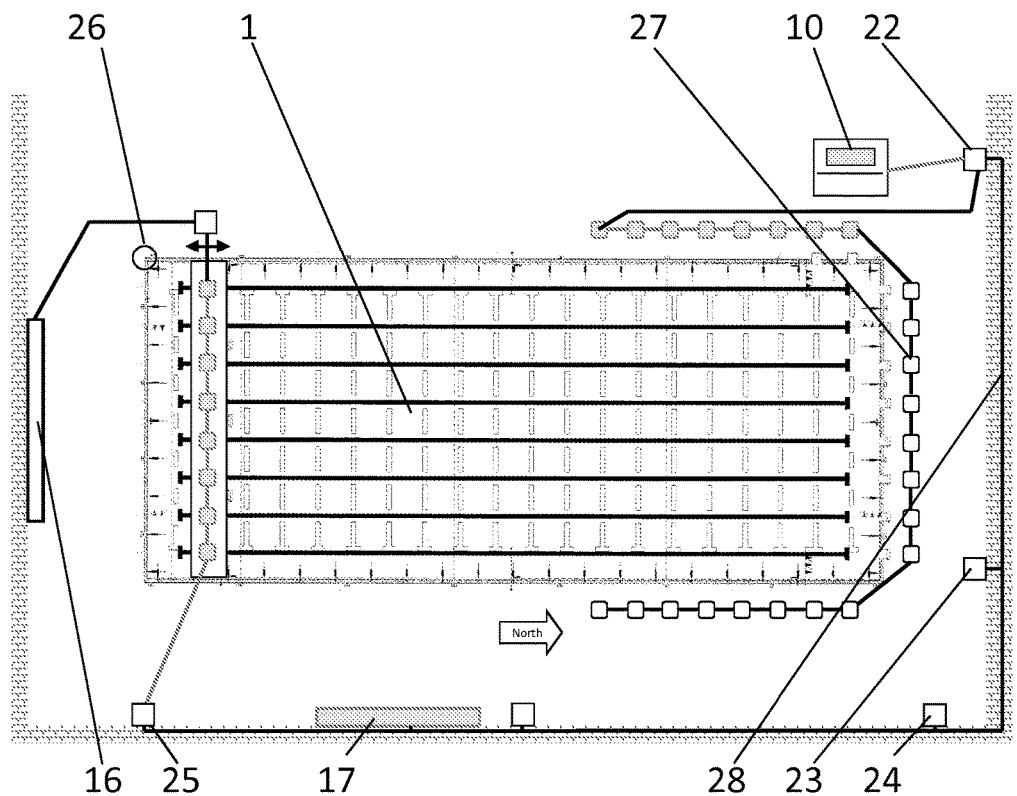
FIG. 3 is a plan view of an exemplary spatial arrangement of a pool having an in-deck bus system, in accordance with an embodiment of the invention.

FIG. 3 is a plan view of an exemplary spatial arrangement of a pool 1 having an in-deck bus system, in accordance with an embodiment of the invention. Referring to FIG. 3, a control device node 10, scoreboard nodes 16, 17, course connection nodes 22-25, hub nodes 27, and wiring 28 of an in-deck bus system are spatially represented around a pool 1 relative an origin 26. As shown in FIG. 3, the wiring 28 of the bus system is reduced, particularly between the course connection nodes 22-25, compared with the wiring of FIG. 1. The cable from the control device 10 is also less complicated, by connecting to one system (e.g., course connection node 22) instead of data connections, scoreboards, and both ends as in conventional systems.

Still referring to FIG. 3, a connected control device 10 can reconstruct and display one or several representations of the pool 1 and its in-deck system using spatial information for each node 10, 22-25, 27 of the system relative to an origin 26, such as the south-western corner of the pool, and the spatial information of the pool environment, such as the location of the pool, walls, and the like. The spatial information can be retrieved from each node, from redundant files stored in one or several nodes (e.g., the course connection nodes 22-25), from the control node 10 if it can identify the in-deck installation, the internet, or other suitable spatial information storage mechanisms. The representation, which may look similar to FIG. 3, may be used to configure courses, near ends and far ends, utilized lanes, scoreboards, scoring data nodes, and time data nodes without having to manually plug connections into the correct places in complex course and data connection setups. The configuration can be realized, for example, by creating representations with a processor, presenting the representations on a display screen of the control node 10, and allowing for the representations of the nodes to be selected and/or marked as near end, far end, scoring device, and the like.

Figure 4:
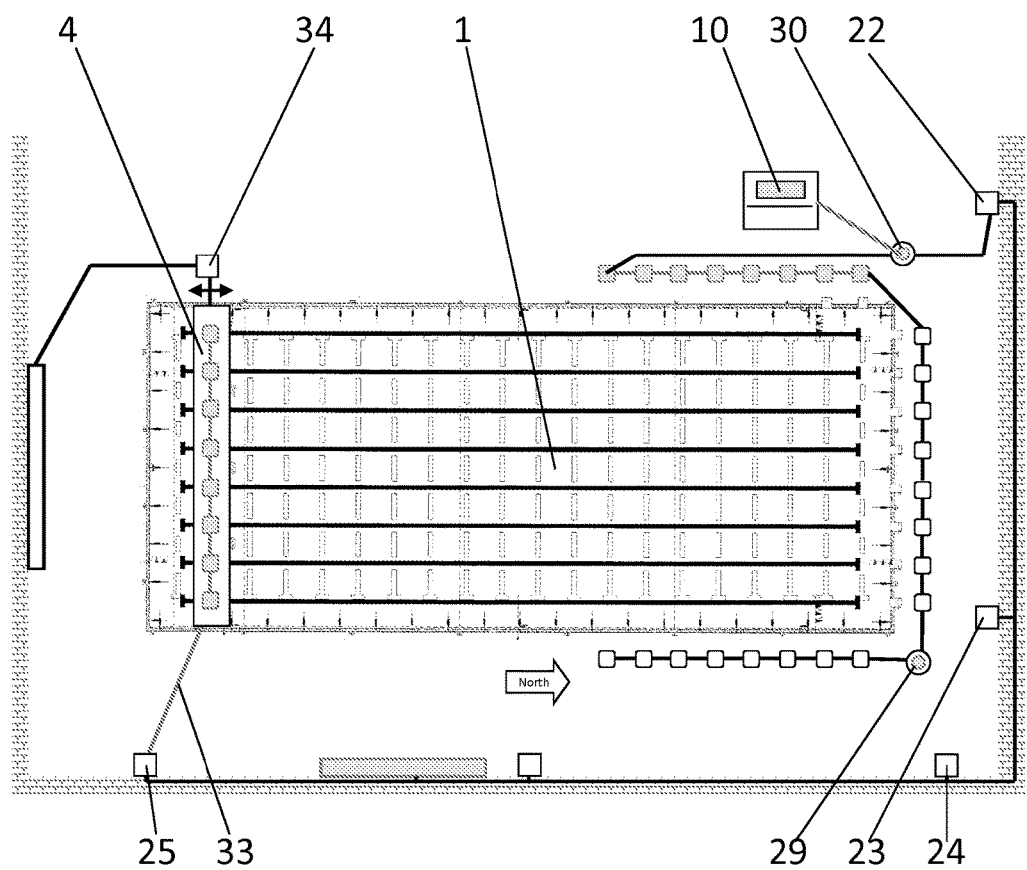
FIG. 4 is a plan view of an exemplary spatial arrangement of a pool having an in-deck bus system with floor plates, in accordance with an embodiment of the invention.

FIG. 4 is a plan view of an exemplary spatial arrangement of a pool 1 having an in-deck bus system with floor plates 29, 30, 34, in accordance with an embodiment of the invention. Referring to FIG. 4, three additional floor plates 29, 30, 34 are shown with the setup of FIG. 3. The floor plates 29, 30, 34 are nodes with spatial knowledge in the system and are positioned directly on the pool deck. Floor plate 29 may be an addition and/or alternative to course connections 23, 24. Floor plate 30 can be an addition and/or alternative to course connection 22 to connect the control device 10 to the in-deck system. For example, the control device 10 may be placed on a table close to the edge of the pool 1. The connection of the control device 10 to floor plate 30 may allow for the elimination of a cable running to the wall, thereby allowing traffic around the pool without having to step over a cable. Floor plate 34 can be an addition and/or alternative to connect the bulkhead 4 to course connection 25, which may allow for the elimination of the movable bulkhead cable 33 to remove a potential hazard from the pool deck.

Figure 5:
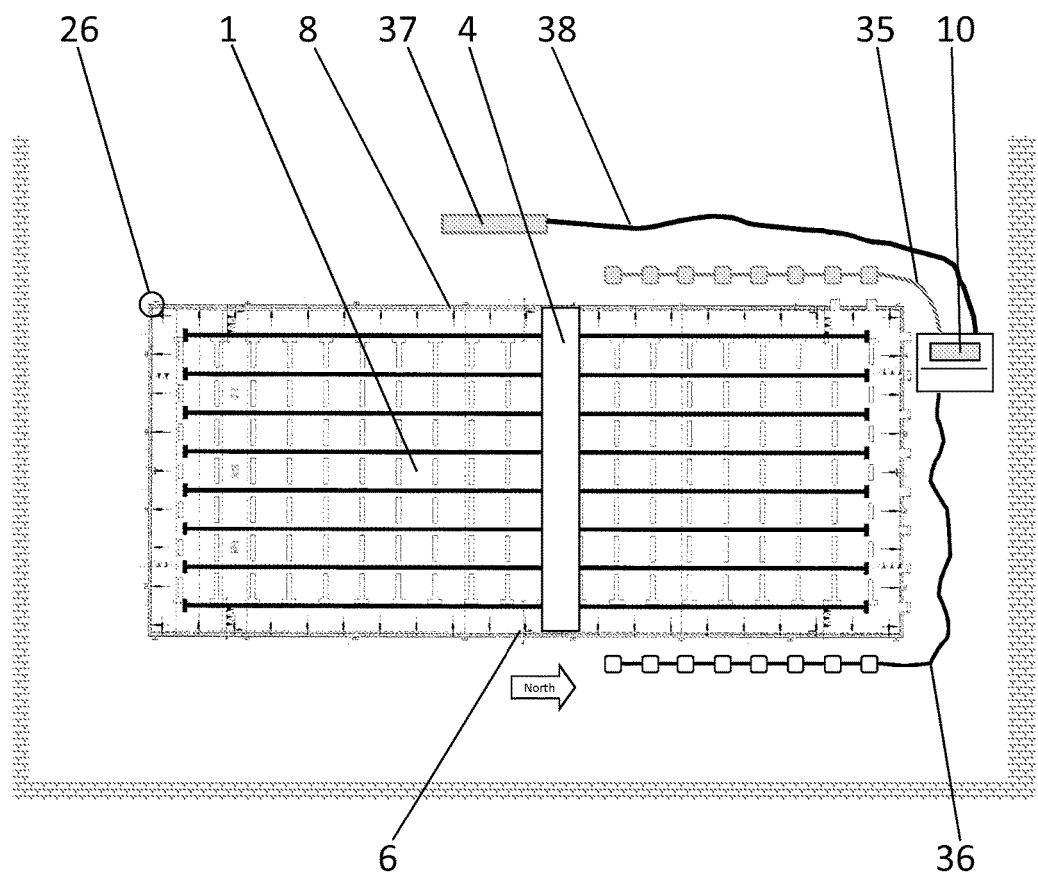
FIG. 5 is a plan view of an exemplary spatial arrangement of a pool having a moveable on-deck bus system, in accordance with an embodiment of the invention.

FIG. 5 is a plan view of an exemplary spatial arrangement of a pool 1 having a moveable on-deck bus system, in accordance with an embodiment of the invention. Referring to FIG. 5, a pool 1 with a bulkhead 4 and an on-deck system having a control device 10, cable harnesses 35, 36, mobile scoreboard 37, and cable 38 are set up for a cross course race. One of the cable harness 35 may be configured by the control device 10 as the near end on the west side 8 and the other cable harness 36 can be configured as the far end on the east side 6 of the pool 1. A mobile scoreboard 37 may be positioned on the pool deck and connected to the control node 10 with a cable 38. The control node 10, the nodes of the cable harnesses 35, 36, and the portable scoreboard 37 have mechanisms to provide spatial knowledge relative to the pool origin 26, the other three corners of the pool 1, and other pool environment structure, such as the walls. For example, an operator of the control device 10 may manually add the spatial knowledge of the cable harnesses 35, 36, while the control node 10 could have automated mechanisms to retrieve its spatial knowledge relative to the pool origin 26. The control node 10 can create representations of the on-deck system to configure the system for a particular race.

Still referring to FIG. 5, the bulkhead 4 may be set to roughly the middle of the pool to create, for example, a water polo space on the south end of the pool while the cross course swim race is set up on the north end. In various embodiments, the control node 10 can run both events at the same time, using different sections of the portable scoreboard 37 to present the results for the different sports events.

Figure 6:
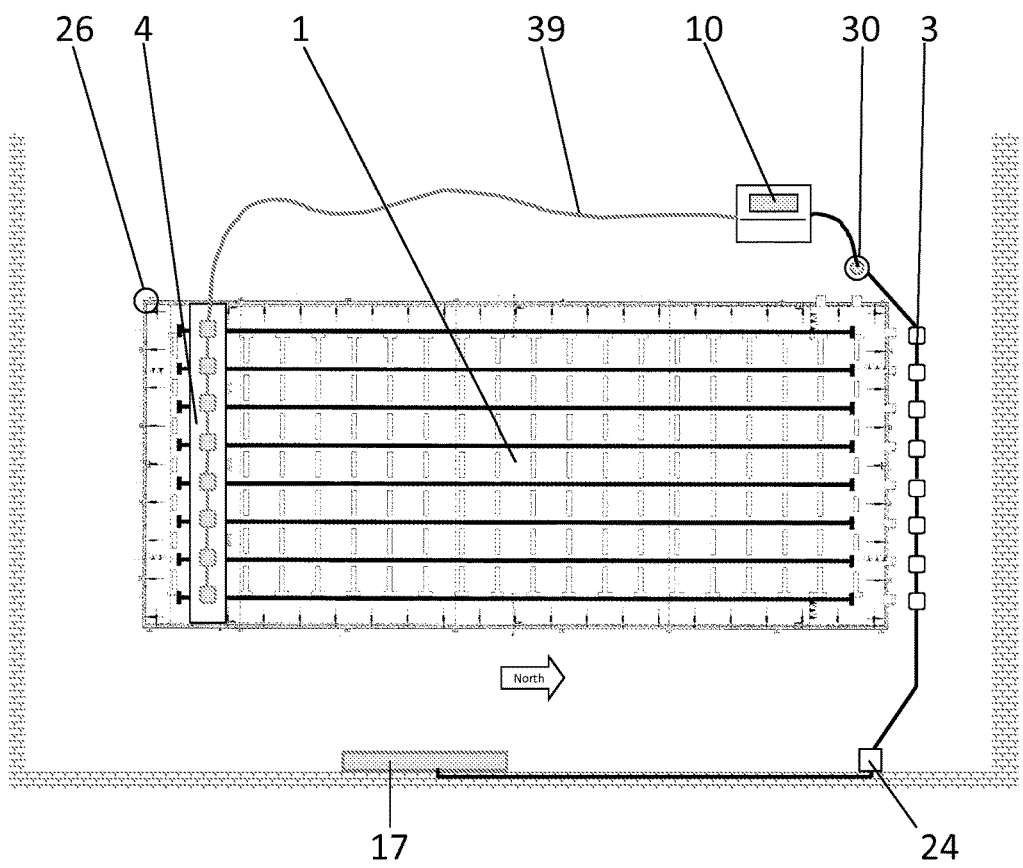
FIG. 6 is a plan view of an exemplary spatial arrangement of a pool having bus system with a permanently installed in-deck portion and a movable on-deck portion, in accordance with an embodiment of the invention.

FIG. 6 is a plan view of an exemplary spatial arrangement of a pool 1 having a bus system with a permanently installed in-deck portion 3, 17, 24, 30 and a movable on-deck portion 39, in accordance with an embodiment of the invention. Referring to FIG. 6, the mixed in-deck and on-deck system comprises a scoreboard 17, course connection 24, hubs 3, and floor plate 30 that are permanently installed and a moveable cable harness 39 laid out on a bulkhead 4. The control node 10 is connected to the floor plate 30 and the cable harness 39. The in-deck portion 3, 17, 24, 30 may provide its spatial knowledge relative to the origin 26. An operator of the control device 10 may, for example, manually enter the spatial knowledge for the on-deck portion 39 into the representations used for configuration and execution of the sports event.

Aspects of the present invention simplify course connection and multiple data connection setup and enhance the user experience by replacing conventional course connections 11-15, 31, scoreboard connections 18-21, 32, scoring data connections 35-36, and time data connections as illustrated in FIG. 1, with simplified course connections 22-25 and/or cable harnesses 35, 36 as illustrated in FIGS. 2-6. For example, hubs 27, scoreboards 16, 17, and course connections 22-25 may be connected using a bus and/or a wireless network. One or more control devices 10 may connect to the hubs 27 and scoreboards 16, 17 by connecting to a course connection 22-25. The control devices 10, hubs 27, scoreboards 16, 17, and course connections 22-25 may each be equipped with a processor and is a participating communicating node of the system. An exemplary embodiment provides a system that allows a control device node 10 with one cable or wireless connection to communicatively connect to hub nodes 27, scoreboard nodes 16, 17, and other control device nodes 10 in the system.

Certain embodiments provide that more than one bus can be used, such as a timing bus and a scoreboard/scoring/time data bus, which are controlled by the control device 10. Various embodiments provide more than one timing bus and/or more than one scoreboard bus that are configured to connect corresponding timing nodes, scoreboard nodes, and the like. In various embodiments, a wireless system may be implemented such that the nodes communicate wirelessly. In certain embodiments, a combination of wired and wireless communication can be implemented between the nodes. In embodiments employing more than one bus, certain embodiments provide that the bus connections and, if possible, other component connections (e.g., power, meet management systems, swim start systems, the internet, computer networks, and the like) be combined into one connector or as few connectors as possible.

In various embodiments, each of the system nodes 10, 16, 17, 22-25, 27, 34 is associated with spatial knowledge as to the location of the respective node relative to the pool 1. The spatial knowledge may be in the form of, for example, coordinates stored in a given node, while each given node has a unique identifier in the system. As another example, one or more configuration files with coordinates and unique identifiers for all or some nodes may be stored in the system, a control device 10, or any suitable location from which files may be accessed. In certain embodiments, the spatial knowledge can be stored redundantly within the system and/or at a location accessible to the system. Redundant spatial knowledge may be helpful, for example, when changing out a given node in a place with known coordinates in the course of a repair. For example, a new node, having its own unique identifier in the system, installed in the place with known coordinates, can be configured with the known coordinates from the redundant configuration file.

In an exemplary embodiment, one or more of the nodes may have permanent locations such as those mounted in the deck or on the walls. Additionally and/or alternatively, one or more of the nodes can have variable locations such as nodes mounted on a cable harness 35, 36 or bulkhead 4. The information where a node is mounted on a bulkhead 4 together with the information where the bulkhead 4 is located in the pool 1, for example, by using the location of the connection hub where the bulkhead 4 is plugged in, results in the absolute location of the node relative to the pool 1 in a given set up of the bulkhead 4.

In certain embodiments, one or more of the nodes can be moveable and be connected with cables to nodes that are installed in the pool deck or the walls, forming a combined in-deck and on-deck system. The permanently installed connection nodes can provide initial spatial knowledge for the connected wired nodes. In some cases, that initial spatial knowledge can be sufficient for a given application; however, it may only provide spatial knowledge of the connected wired nodes within the radius of the length of the connecting cable. To refine the spatial knowledge, the connected wired nodes can be equipped with mechanisms to acquire additional spatial knowledge, such as the location of the connected nodes with respect to a pool origin 26. For example, mechanisms for acquiring additional spatial knowledge may include manual input of coordinates, a global position system, ultrasound reflectometry, positioning systems with infrared, radio frequencies, laser, and the like.

In the case of an on-deck system without connection to permanently installed nodes as illustrated in FIG. 5, for example, the system may be completely moveable on the pool deck. Some or all of the participating nodes of the moveable system may acquire and/or provide spatial knowledge by mechanisms described above. For example, a moveable system comprising a control node 10, a portable scoreboard node 37, and two cable harnesses 35, 36 each having timing hub nodes can be equipped with an infrared positioning system at one or more of the nodes that delivers spatial information of the nodes relative to an origin 26 of the pool 1.

The system includes information about the pool 1 and surrounding structures relative to an origin 26. For example, the pool information can include reference points such as the pool corners, the pool outline, stairs, information about water depths, the lane line connections, the bulkhead locking points, diving boards, diving towers, starting blocks, and/or any suitable information regarding the pool. The surrounding structure information may include reference points corresponding with walls, pool deck outlines, poles, risers, doors, windows, walking paths, obstructions, bleachers, power outlets, data outlets, speaker systems, lights, or any suitable information regarding a pool environment. In an outdoor pool environment, surrounding structure information can additionally and/or alternatively include reference points corresponding with monuments, lamps, or any suitable information regarding a pool environment.

In various embodiments, the control device node 10 can access the spatial knowledge combined with the unique identifiers of the nodes 10, 16, 17, 22-25, 27, 34, and, together with the spatial knowledge of the pool 1 with its reference points, reconstruct representations of the pool and its in-deck system and/or on-deck system. The representations may be used to configure, for example, courses, near ends and far ends, utilized lanes, utilized scoring devices, utilized time data devices, and scoreboards without having to plug into the correct connections of several course and data connections. The representations can be adapted according to the utilized nodes of the bus of a given sport. For example, the swim timing nodes may not appear in a representation for a diving event.

In an example embodiment, a pool 1 may be configured to accommodate more than one sports event at a time. The system may use one or more control device nodes 10 to execute more than one event. In a chase swimming race, for example, two swim races are run at the same time, where the swimmers of one race start, swim, and the swimmers of a second race start before the swimmers of the first race finish. For example, a 50 meter chase swimming race may have swimmers start on the near end, swim, and climb out on the far end. In the above example, the two races could be either executed with two control device nodes 10 each running one of the two events or with one control device node 10 running both events.

Other examples of multiple events performed simultaneously in a pool include two diving events, two synchronized swimming event, or using a bulkhead 4 set to the middle of the pool 1 to create a cross course swim race on one side and a water polo event on the other side. In these cases, different nodes on the same bus can be used at the same time for different sports events. Further, a given node can be utilized by more than one control node 10.

Nodes that are not used after configuration can be optionally shut down or put into sleep mode such that only the configured nodes are used to run and display the event. The control device(s) 10 may configure a course and/or change a course configuration in response to user inputs manipulating the displayed node representations, for example, without having to plug or unplug cables.

Aspects of the present invention provide the benefit of a simplified installation with much less connection wiring than conventional timing systems. Various embodiments simplify the control device 10 connections such that the connections may be placed directly into a floor of the pool deck. Similarly, connections for a bulkhead and its associated nodes can be located directly into the floor of the pool deck. The connections can be realized with much shorter cables than cables going to course connections or bulkhead connections in walls. In various embodiments, the floor plates 29, 30, 34 may be located outside of walking path areas on the pool deck and inside the area where a control device 10 is located such that the short cables do not cross walking paths, which improves convenience and safety and complies with pool deck regulations for the disabled that ask for clear paths without obstructions. Further, floor plates 29, 30, 34 allow for simple setups in pools without walls, such as outdoor pools.

Certain embodiments provide that the electrical connections may be made from titanium, high performance alloys from the Hastelloy Cr group, alloys from the austenitic nickel-chromium based superalloys such as Inconel 625, and/or any suitable material for withstanding aggressive pool chemicals. The above-mentioned exemplary materials may provide more reliable electrical connections in a pool environment, particularly with regard to the floor connections.

In accordance with various embodiments of the invention, a system configured to provide timing and scoring for aquatic sports in pools comprises a plurality of nodes 16, 17, 22-25, 27 and at least one control device node 10. Each of the plurality of nodes 16, 17, 22-25, 27 comprises a location relative to a pool 1. The at least one control device node 10 is connected to at least one of the plurality of nodes 16, 17, 22-25, 27. The at least one control device node 10 is configured to access spatial knowledge related to at least one of the location of the plurality of nodes 16, 17, 22-25, 27, a position of the pool 1, and reference points 26 of the pool 1. The at least one control device node 10 is configured to generate at least one representation (FIGS. 3-6) of the plurality of nodes 16, 17, 22-25, 27 and the pool 1 based on the spatial knowledge. The at least one control device node 10 is configured to select a plurality of the plurality of nodes 16, 17, 22-25, 27 to set up at least one event based on the at least one representation. The at least one control device node 10 is configured to configure the selected plurality of nodes 16, 17, 22-25, 27 for the at least one event. The at least one control device node 10 is configured to execute the at least one event based on the configured plurality of nodes 16, 17, 22-25, 27.

In various embodiments, the plurality of nodes 16, 17, 22-25, 27 are connected with a bus 28. In certain embodiments, the plurality of nodes 16, 17, 22-25, 27 are connected with a plurality of busses 28. In a representative embodiment, at least a portion of the plurality of nodes 16, 17, 22-25, 27 are connected wirelessly. In various embodiments, the plurality of nodes 16, 17, 22-25, 27 are connected by a combination of at least one bus 28 and at least one wireless connection.

In certain embodiments, the spatial knowledge is redundantly available to the at least one control device node 10. In a representative embodiment, the spatial knowledge is redundantly available outside of the system. In various embodiments, the system comprises floor plates 29, 30, 34 mounted in a deck of the pool 1. The floor plates 29, 30, 34 are configured to connect the at least one control device node 10 with the plurality of nodes 16, 17, 22-25, 27. In certain embodiments, the system comprises at least one bulkhead 4. At least a portion of the plurality of nodes 16, 17, 22-25, 27 are mounted on the at least one bulkhead 4. In various embodiments, the system comprises at least one bulkhead plate 34 configured to connect the portion of the plurality of nodes 16, 17, 22-25, 27 mounted on the at least one bulkhead with the at least one control device node 10.

In a representative embodiment, the system comprises electrical connections between at least one of the plurality of nodes 16, 17, 22-25, 27 and at least one of the plurality of nodes 16, 17, 22-25, 27 and the at least one control device node 10. In certain embodiments, the electrical connections comprise a corrosion resistant material comprising at least one of titanium, high performance alloys from the Hastelloy-Cr group, and austenitic nickel-chromium based alloys. In various embodiments, the system comprises a single connector 22 configured to connect to each of the plurality of busses 28. In a representative embodiment, the system comprises a single connector 22 configured to connect to each of the plurality of busses 28 and at least one of a power source, a swim start system, an internet connection, and a computer network. In certain embodiments, the single connector comprises connections. The connections comprise a corrosion resistant material comprising at least one of titanium, high performance alloys from the Hastelloy-Cr group, and austenitic nickel-chromium based alloys.

In various embodiments, at least one node 16, 17, 22-25, 27 that is not selected to set up the at least one event is configured by the at least one control device node 10. In a representative embodiment, the system comprises at least one moveable node 35-37 connected to at least one of the plurality of nodes 16, 17, 22-25, 27. The at least one control device node 10 determines spatial knowledge related to a placement of the at least one moveable node 35-37 based on the accessed spatial knowledge of the location of the at least one of the plurality of nodes 16, 17, 22-25, 27 connected to the at least one moveable node 35-37.

In certain embodiments, the system comprises at least one moveable node 35-37 connected to at least one of the plurality of nodes 16, 17, 22-25, 27 comprising a placement relative to the pool 1. The at least one moveable node 35-37 comprises a placement identification mechanism configured to provide the at least one control device node 10 with the spatial knowledge. In various embodiments, the system comprises at least one moveable node 35-37 having a placement identification mechanism configured to provide the at least one control device node 10 with the spatial knowledge.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system configured to provide timing and scoring for aquatic sports in pools, the system comprising:
    a plurality of nodes, each of the plurality of nodes comprising a location relative to a pool; and
    at least one control device node having a display screen, the at least one control device node connected to at least one of the plurality of nodes, the at least one control device node configured to:
        access spatial knowledge related to at least one of:
            the location of the plurality of nodes,
            a position of the pool, and
            reference points of the pool;
        generate and display at the display screen at least one representation of the plurality of nodes and the pool based on the spatial knowledge;
        receive a selection of a plurality of the plurality of nodes to set up at least one event based on the at least one representation;
        configure the selected plurality of nodes for the at least one event; and
        execute the at least one event based on the configured plurality of nodes.

2. The system according to claim 1, wherein the plurality of nodes are connected with a bus.

3. The system according to claim 1, wherein the plurality of nodes are connected with a plurality of busses.

4. The system according to claim 1, wherein at least a portion of the plurality of nodes are connected wirelessly.

5. The system according to claim 1, wherein the plurality of nodes are connected by a combination of at least one bus and at least one wireless connection.

6. The system according to claim 1, wherein the spatial knowledge is redundantly available to the at least one control device node.

7. The system according to claim 1, wherein the spatial knowledge is redundantly available outside of the system.

8. The system according to claim 1, comprising floor plates mounted in a deck of the pool, the floor plates configured to connect the at least one control device node with the plurality of nodes.

9. The system according to claim 1, comprising at least one bulkhead, wherein at least a portion of the plurality of nodes are mounted on the at least one bulkhead.

10. The system according to claim 9, comprising at least one bulkhead plate configured to connect the portion of the plurality of nodes mounted on the at least one bulkhead with the at least one control device node.

11. The system according to claim 1, comprising electrical connections between at least one of:
 the plurality of nodes, and
 at least one of the plurality of nodes and the at least one control device node.

12. The system according to claim 11, wherein the electrical connections comprise a corrosion resistant material comprising at least one of:
 titanium,
 high performance alloys from the Hastelloy-Cr group, and
 austenitic nickel-chromium based alloys.

13. The system according to claim 3, comprising a single connector configured to connect to each of the plurality of busses.

14. The system according to claim 3, comprising a single connector configured to connect to each of the plurality of busses and at least one of:
 a power source,
 a swim start system,
 an internet connection, and
 a computer network.

15. The system according to claim 13, wherein the single connector comprises connections, the connections comprising a corrosion resistant material comprising at least one of:
 titanium,
 high performance alloys from the Hastelloy-Cr group, and
 austenitic nickel-chromium based alloys.

16. The system according to claim 1, wherein at least one node that is not selected to set up the at least one event is configured by the at least one control device node.

17. The system according to claim 1, comprising at least one moveable node connected to at least one of the plurality of nodes, wherein the at least one control device node determines spatial knowledge related to a placement of the at least one moveable node based on the accessed spatial knowledge of the location of the at least one of the plurality of nodes connected to the at least one moveable node.

18. The system according to claim 1, comprising at least one moveable node connected to at least one of the plurality of nodes comprising a placement relative to the pool, wherein the at least one moveable node comprises a placement identification mechanism configured to provide the at least one control device node with the spatial knowledge.

19. The system according to claim 1, comprising at least one moveable node having a placement identification mechanism configured to provide the at least one control device node with the spatial knowledge.

* * * * *